US012659116B2

(12) United States Patent
Cha et al.

(10) Patent No.: US 12,659,116 B2
(45) Date of Patent: Jun. 16, 2026

(54) CONFIGURATION OF POSITIONING SRS TRIGGERING STATES

(71) Applicant: Nokia Technologies Oy, Espoo (FI)

(72) Inventors: Hyun-Su Cha, Naperville, IL (US); Tao Tao, Shanghai (CN); Ryan Keating, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/090,819

(22) Filed: Mar. 26, 2025

(65) Prior Publication Data

US 2025/0226952 A1      Jul. 10, 2025

Related U.S. Application Data

(63) Continuation of application No. PCT/CN2022/123010, filed on Sep. 30, 2022.

(51) Int. Cl.
*H04L 5/00* (2006.01)
*H04W 72/0453* (2023.01)
(Continued)

(52) U.S. Cl.
CPC .......... *H04L 5/0051* (2013.01); *H04L 5/0012* (2013.01); *H04L 5/0048* (2013.01);
(Continued)

(58) Field of Classification Search
CPC ..... H04L 5/0051; H04L 5/001; H04L 5/0048; H04L 5/0012; H04L 5/0098;
(Continued)

(56) References Cited

U.S. PATENT DOCUMENTS

2021/0195565 A1* 6/2021 Venugopal ............ H04L 5/0096
2022/0045884 A1* 2/2022 Lin ........................ H04L 5/0098
(Continued)

FOREIGN PATENT DOCUMENTS

CN          114830585 A      7/2022
WO      2021/186727 A1      9/2021
(Continued)

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-229.
(Continued)

*Primary Examiner* — Omar J Ghowrwal
(74) *Attorney, Agent, or Firm* — Nokia Technologies Oy

(57) ABSTRACT

Example embodiments of the present disclosure relate to positioning enhancements. A first device receives, from a second device providing a serving cell for the first device, a configuration of a plurality of SRS triggering states associated with a plurality of SRSs on a group of bandwidth parts. The first device receives, from the second device, an indication of a target triggering state of the plurality of SRS triggering states. The first device then transmits, based on the target triggering state, the plurality of SRSs on at least a part of the group of bandwidth parts sequentially. In this way, SRS transmissions across multiple SRS resources or SRS resource sets withing multiple BWPs can be triggered in a frequency hopping manner via single DCI, which reduces the signaling overhead and latency, and improve the positioning efficiency.

3 Claims, 9 Drawing Sheets

(51) Int. Cl.

| | | |
|---|---|---|
| *H04W 72/23* | (2023.01) | |
| *H04W 72/232* | (2023.01) | |
| *H04W 64/00* | (2009.01) | |
| *H04W 72/21* | (2023.01) | |

(52) U.S. Cl.
CPC ....... *H04L 5/0098* (2013.01); *H04W 72/0453* (2013.01); *H04W 72/23* (2023.01); *H04W 72/232* (2023.01); *H04L 5/001* (2013.01); *H04W 64/00* (2013.01); *H04W 72/21* (2023.01)

(58) Field of Classification Search
CPC .......... H04W 72/0453; H04W 72/232; H04W 64/00; H04W 72/21; H04W 72/23
See application file for complete search history.

(56) References Cited

U.S. PATENT DOCUMENTS

| | | | | |
|---|---|---|---|---|
| 2022/0109466 | A1 | 4/2022 | Manolakos et al. | |
| 2022/0232535 | A1 | 7/2022 | Abdelghaffar et al. | |
| 2023/0179347 | A1 * | 6/2023 | Nilsson | H04L 5/0051 |
| | | | | 370/329 |
| 2023/0262526 | A1 * | 8/2023 | Yuan | H04L 5/0057 |
| | | | | 455/422.1 |
| 2024/0031103 | A1 * | 1/2024 | Liu | H04L 5/0051 |

FOREIGN PATENT DOCUMENTS

| | | | |
|---|---|---|---|
| WO | 2021/227070 | A1 | 11/2021 |
| WO | 2021/229537 | A1 | 11/2021 |
| WO | 2022/005691 | A1 | 1/2022 |
| WO | 2022/051151 | A1 | 3/2022 |
| WO | 2022/126148 | A2 | 6/2022 |
| WO | 2022/169500 | A1 | 8/2022 |

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.

"3rd Generation Partnership Project; Technical Specification Group Radio Access Network; LTE Positioning Protocol (LPP) (Release 17)", 3GPP TS 37.355, V17.1.0, Jun. 2022, pp. 1-345.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"Positioning for Reduced Capabilities UEs", 3GPP TSG RAN WG1 #109-e, R1-2205042, Agenda: 9.5.3, Qualcomm Incorporated, May 9-20, 2022, pp. 1-17.

"On enhancements for NR positioning support of RedCap UEs", 3GPP TSG RAN WG1 #109-e, R1-2204808, Agenda: 9.5.3, Intel Corporation, May 9-20, 2022, pp. 1-15.

"3rd Generation Partnership Project; Technical Specification Group Radio Access Network; Evolved Universal Terrestrial Radio Access (E-UTRA); LTE Positioning Protocol (LPP (Release 17)", 3GPP TS 36.355, V17.0.0, Mar. 2022, pp. 1-8.

"3rd Generation Partnership Project; Technical Specification Group Radio Access Network; NR; Multiplexing and channel coding (Release 17)", 3GPP TS 38.212, V17.2.0, Jun. 2022, pp. 1-201.

"Discussions on NR Positioning Enhancements", 3GPP TSG RAN WG1 #103-e, R1-2008226, Agenda: 8.5.3, OPPO, Oct. 26-Nov. 13, 2020, 10 pages.

"IEEE 802.11", Wikipedia, Retrieved on Apr. 29, 2025, Webpage available at : https://en.wikipedia.org/wiki/IEEE_802.11.

International Search Report and Written Opinion received for corresponding Patent Cooperation Treaty Application No. PCT/CN2022/123010, dated May 24, 2023, 8 pages.

"Positioning enhancement in Rel-17", 3GPP TSG RAN WG1 Meeting #103-e, R1-2007577, Agenda: 8.5.3, Huawei, Oct. 26-Nov. 13, 2020, 18 pages.

"Views on Positioning for RedCap UEs", 3GPP TSG RAN WG1 #113, R1-2305180, Agenda: 9.5.5, Nokia, May 22-26, 2023, 8 pages.

"Views on bandwidth aggregation for positioning measurements", 3GPP TSG RAN WG1 #113, R1-2305179, Agenda: 9.5.4, Nokia, May 22-26, 2023, 10 pages.

"Views on Positioning for RedCap UEs", 3GPP TSG RAN WG1 #112-bis-e, R1-2302937, Agenda: 9.5.5, Nokia, Apr. 17-26, 2023, 6 pages.

Notice of Allowance received for corresponding Korean Patent Application No. 2025-7013922, dated Jun. 19, 2025, 2 pages of Notice of Allowance and 1 page of translation available.

"Enhancements on Rel-17 SRS", 3GPP TSG RAN WG1 #104bis-e, R1-2102603, Agenda: 8.1.3, CATT, Apr. 12-20, 2021, 12 pages.

Notice of Allowance received for corresponding Japanese Patent Application No. 2025-518626, dated Sep. 4, 2025, 2 pages of Notice of Allowance and no page of translation available.

"Views on Positioning for RedCap UEs", 3GPP TSG RAN WG1 #110, R1-2206493, Agenda: 9.5.3, Nokia, Aug. 22-26, 2022, 5 pages.

Extended European Search Report received for corresponding European Patent Application No. 22960208.1, dated Jan. 27, 2026, 10 pages.

"Enhancements on SRS flexibility, Coverage and Capacity", 3GPP TSG RAN WG1 #104-e-bis, R1-2103370, Agenda: 8.1.3, Nokia, Apr. 12-20, 2021, 18 pages.

"Feature Lead Summary#1 for Positioning for RedCap UEs", 3GPP TSG RAN WG1 #110, R1-2207749, Agenda: 9.5.3, Ericsson, Aug. 22-26, 2022, 28 pages.

"OTDOA Enhancements for FeMTC", 3GPP TSG RAN WG1 Meeting #86bis, R1-1608896, Agenda: 7.2.8.3, Nokia, Oct. 10-14, 2016, 4 pages.

Office action received for corresponding Australian Patent Application No. 2022479859, dated Mar. 6, 2026, 3 pages.

Office action received for corresponding Canadian Patent Application No. 3269029, dated Mar. 17, 2026, 3 pages.

* cited by examiner

500

510

RECEIVE A CONFIGURATION OF A PLURALITY OF SRS TRIGGERING STATES ASSOCIATED WITH A PLURALITY OF SRS ON A GROUP OF BANDWIDTH PARTS

520

RECEIVE AN INDICATION OF A TARGET TRIGGERING STATE OF THE PLURALITY OF SRS TRIGGERING STATES

530

TRANSMIT THE PLURALITY OF SRS ON AT LEAST A PART OF THE GROUP OF BANDWIDTH PARTS SEQUENTIALLY BASED ON THE TARGET TRIGGERING STATE

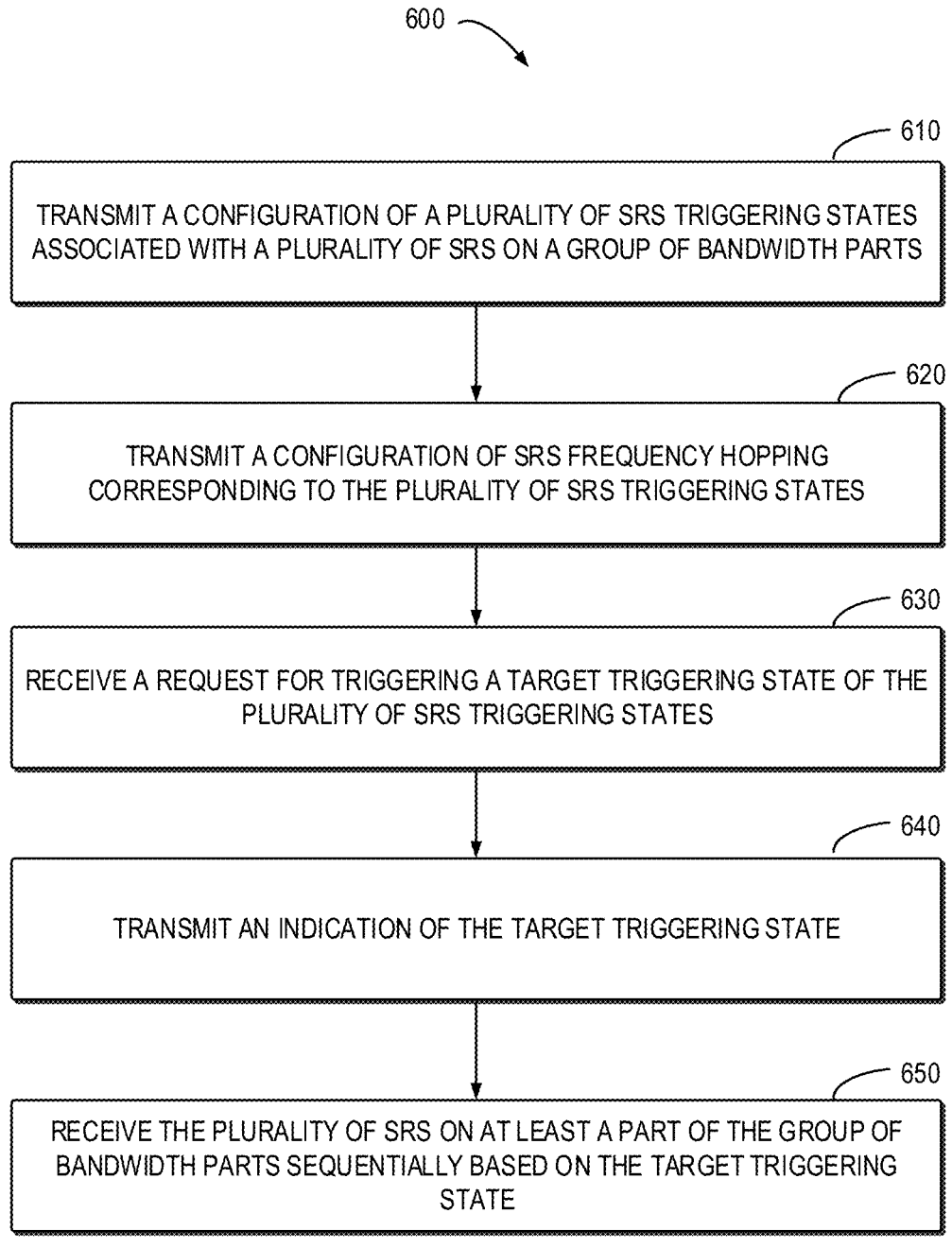

600

610

TRANSMIT A CONFIGURATION OF A PLURALITY OF SRS TRIGGERING STATES ASSOCIATED WITH A PLURALITY OF SRS ON A GROUP OF BANDWIDTH PARTS

620

TRANSMIT A CONFIGURATION OF SRS FREQUENCY HOPPING CORRESPONDING TO THE PLURALITY OF SRS TRIGGERING STATES

630

RECEIVE A REQUEST FOR TRIGGERING A TARGET TRIGGERING STATE OF THE PLURALITY OF SRS TRIGGERING STATES

640

TRANSMIT AN INDICATION OF THE TARGET TRIGGERING STATE

650

RECEIVE THE PLURALITY OF SRS ON AT LEAST A PART OF THE GROUP OF BANDWIDTH PARTS SEQUENTIALLY BASED ON THE TARGET TRIGGERING STATE

RECEIVE A CONFIGURATION OF SRS FREQUENCY HOPPING CORRESPONDING TO A PLURALITY OF SRS TRIGGERING STATES THAT ARE ASSOCIATED WITH A PLURALITY OF SRS ON A GROUP OF BANDWIDTH PARTS

720

TRANSMIT A REQUEST FOR TRIGGERING A TARGET TRIGGERING STATE OF THE PLURALITY OF SRS TRIGGERING STATES

730

RECEIVE A FIRST REPORT OF POSITIONING MEASUREMENTS OF THE PLURALITY OF SRS

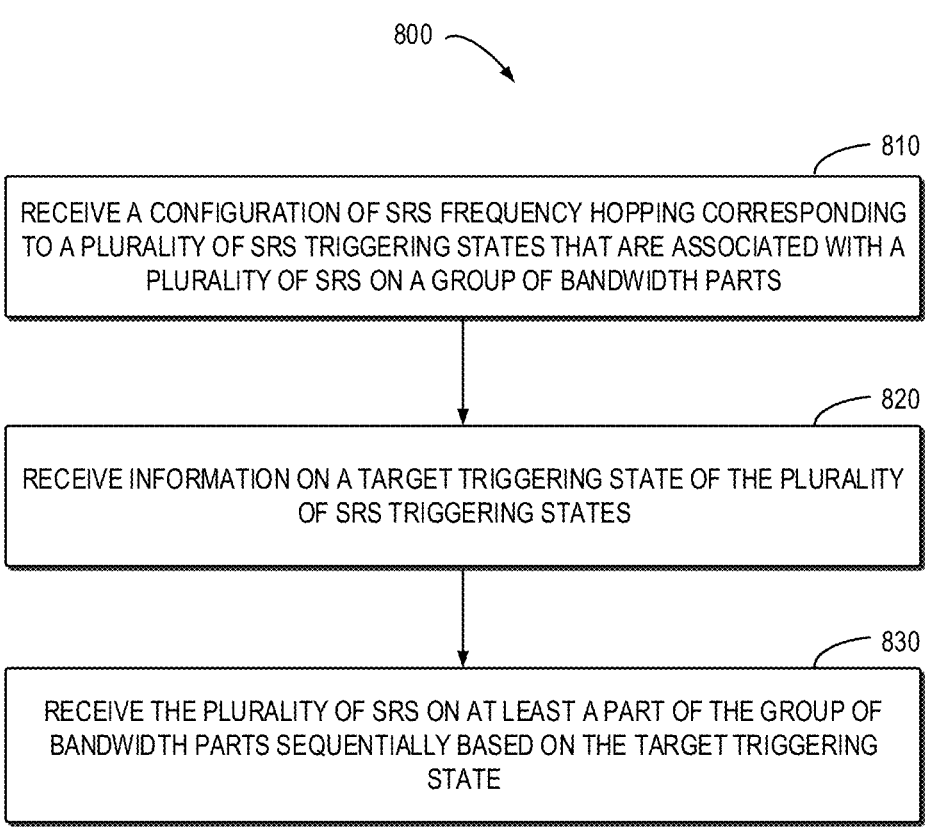

800

810

RECEIVE A CONFIGURATION OF SRS FREQUENCY HOPPING CORRESPONDING TO A PLURALITY OF SRS TRIGGERING STATES THAT ARE ASSOCIATED WITH A PLURALITY OF SRS ON A GROUP OF BANDWIDTH PARTS

820

RECEIVE INFORMATION ON A TARGET TRIGGERING STATE OF THE PLURALITY OF SRS TRIGGERING STATES

830

RECEIVE THE PLURALITY OF SRS ON AT LEAST A PART OF THE GROUP OF BANDWIDTH PARTS SEQUENTIALLY BASED ON THE TARGET TRIGGERING STATE

FIG. 8

CONFIGURATION OF POSITIONING SRS TRIGGERING STATES

FIELD

Various example embodiments of the present disclosure generally relate to the field of telecommunication and in particular, to methods, devices, apparatuses and computer readable storage medium for positioning enhancements.

BACKGROUND

In a communication network, reference signals, such as, positioning reference signal (PRS), sounding reference signal (SRS), etc., are used for positioning related measurements The downlink (DL) PRS bandwidth and the uplink (UL) SRS bandwidth are needed factors to the positioning accuracy. For a narrow band system, the positioning performance may be degraded due to low sampling rate. This issue may be alleviated by implementing PRS/SRS frequency hopping and stitching. In this case, UE or gNB measure a corresponding PRS or SRS on narrow bandwidth each time, and thus coherent processing across multiple PRS/SRS frequency hops is enabled.

SUMMARY

In general, example embodiments of the present disclosure provide a solution of positioning enhancements.

In a first aspect of the present disclosure, there is provided a first device. The first device comprises at least one processor; and at least one memory storing instructions that, when executed by the at least one processor, cause the first device at least to perform: receiving, from a second device providing a serving cell for the first device, a configuration of a plurality of sounding reference signal, SRS, triggering states associated with a plurality of SRSs on a group of bandwidth parts; receiving, from the second device, an indication of a target triggering state of the plurality of SRS triggering states; and transmitting, based on the target triggering state, the plurality of SRSs on at least a part of the group of bandwidth parts sequentially.

In a second aspect of the present disclosure, there is provided a second device. The second device comprises at least one processor; and at least one memory storing instructions that, when executed by the at least one processor, cause the second device at least to perform: transmitting, to a first device in a serving cell provided by the second device, a configuration of a plurality of SRS triggering states associated with a plurality of SRSs on a group of bandwidth parts; transmitting, to a third device, a configuration of SRS frequency hopping corresponding to the plurality of SRS triggering states; in response to receiving a request for triggering a target triggering state of the plurality of SRS triggering states from the third device, transmitting an indication of the target triggering state to the first device; and receiving, from the first device and based on the target triggering state, the plurality of SRSs on at least a part of the group of bandwidth parts sequentially.

In a third aspect of the present disclosure, there is provided a third device. The third device comprises at least one processor; and at least one memory storing instructions that, when executed by the at least one processor, cause the third device at least to perform: receiving, from a second device providing a serving cell for a first device, a configuration of SRS frequency hopping corresponding to a plurality of SRS triggering states that are associated with a plurality of SRSs on a group of bandwidth parts; transmitting, to the second device, a request for triggering a target triggering state of the plurality of SRS triggering states, the target triggering state causing the first device to transmit a plurality of SRSs on at least a part of the group of bandwidth parts sequentially; and receiving, from the second device, a first report of positioning measurements of the plurality of SRSs.

In a fourth aspect of the present disclosure, there is provided a fourth device. The fourth device comprises at least one processor; and at least one memory storing instructions that, when executed by the at least one processor, cause the fourth device at least to perform: receiving, from a second device providing a serving cell for a first device, a configuration of SRS frequency hopping corresponding to a plurality of SRS triggering states that are associated with a plurality of SRSs on a group of bandwidth parts; receiving information on a target triggering state of the plurality of SRS triggering states; and receiving, from the first device and based on the target triggering state, the plurality of SRSs on at least a part of the group of bandwidth parts sequentially.

In a fifth aspect of the present disclosure, there is provided a method. The method comprises: receiving, at a first device and from a second device providing a serving cell for the first device, a configuration of a plurality of sounding reference signal, SRS, triggering states associated with a plurality of SRSs on a group of bandwidth parts; receiving, from the second device, an indication of a target triggering state of the plurality of SRS triggering states; and transmitting, based on the target triggering state, the plurality of SRSs on at least a part of the group of bandwidth parts sequentially.

In a sixth aspect of the present disclosure, there is provided a method. The method comprises: transmitting, at a second device and to a first device in a serving cell provided by the second device, a configuration of a plurality of SRS triggering states associated with a plurality of SRSs on a group of bandwidth parts; transmitting, to a third device, a configuration of SRS frequency hopping corresponding to the plurality of SRS triggering states; in response to receiving a request for triggering a target triggering state of the plurality of SRS triggering states from the third device, transmitting an indication of the target triggering state to the first device; and receiving, from the first device and based on the target triggering state, the plurality of SRSs on at least a part of the group of bandwidth parts sequentially.

In a seventh aspect of the present disclosure, there is provided a method. The method comprises: receiving, at a third device and from a second device providing a serving cell for a first device, a configuration of SRS frequency hopping corresponding to a plurality of SRS triggering states that are associated with a plurality of SRSs on a group of bandwidth parts; transmitting, to the second device, a request for triggering a target triggering state of the plurality of SRS triggering states, the target triggering state causing the first device to transmit a plurality of SRSs on at least a part of the group of bandwidth parts sequentially; and receiving, from the second device, a first report of positioning measurements of the plurality of SRS.

In an eighth aspect of the present disclosure, there is provided a method. The method comprises: receiving, at a fourth device and from a second device providing a serving cell for a first device, a configuration of SRS frequency hopping corresponding to a plurality of SRS triggering states that are associated with a plurality of SRSs on a group of bandwidth parts; receiving information on a target triggering state of the plurality of SRS triggering states; and receiving, from the first device and based on the target triggering state, the plurality of SRSs on at least a part of the group of bandwidth parts sequentially.

In a ninth aspect of the present disclosure, there is provided a first apparatus. The first apparatus comprises: means for receiving, from a second apparatus providing a serving cell for the first apparatus, a configuration of a plurality of sounding reference signal, SRS, triggering states associated with a plurality of SRSs on a group of bandwidth parts; means for receiving, from the second apparatus, an indication of a target triggering state of the plurality of SRS triggering states; and means for transmitting, based on the target triggering state, the plurality of SRSs on at least a part of the group of bandwidth parts sequentially.

In a tenth aspect of the present disclosure, there is provided a second apparatus. The second apparatus comprises: means for transmitting, to a first apparatus in a serving cell provided by the second apparatus, a configuration of a plurality of SRS triggering states associated with a plurality of SRSs on a group of bandwidth parts; means for transmitting, to a third apparatus, a configuration of SRS frequency hopping corresponding to the plurality of SRS triggering states; means for in response to receiving a request for triggering a target triggering state of the plurality of SRS triggering states from the third apparatus, transmitting an indication of the target triggering state to the first apparatus; and means for receiving, from the first apparatus and based on the target triggering state, the plurality of SRSs on at least a part of the group of bandwidth parts sequentially.

In an eleventh aspect of the present disclosure, there is provided a third apparatus. The third apparatus comprises: means for receiving, from a second apparatus providing a serving cell for a first apparatus, a configuration of SRS frequency hopping corresponding to a plurality of SRS triggering states that are associated with a plurality of SRSs on a group of bandwidth parts; means for transmitting, to the second apparatus, a request for triggering a target triggering state of the plurality of SRS triggering states, the target triggering state causing the first apparatus to transmit a plurality of SRSs on at least a part of the group of bandwidth parts sequentially; and means for receiving, from the second apparatus, a first report of positioning measurements of the plurality of SRSs.

In a twelfth aspect of the present disclosure, there is provided a fourth apparatus. The fourth apparatus comprises: receiving, from a second apparatus providing a serving cell for a first apparatus, a configuration of SRS frequency hopping corresponding to a plurality of SRS triggering states that are associated with a plurality of SRSs on a group of bandwidth parts; receiving information on a target triggering state of the plurality of SRS triggering states; and receiving, from the first apparatus and based on the target triggering state, the plurality of SRSs on at least a part of the group of bandwidth parts sequentially.

In a thirteenth aspect of the present disclosure, there is provided a computer readable medium. The computer readable medium comprises instructions stored thereon for causing an apparatus to perform at least the method according to any of the fifth aspect, the sixth aspect, the seventh aspect or the eighth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 6 illustrates a flowchart of a method implemented at a first device according to some example embodiments of the present disclosure;

FIG. 8 illustrates a flowchart of a method implemented at a fourth device according to some example embodiments of the present disclosure;

Throughout the drawings, the same or similar reference numerals represent the same or similar element.

DETAILED DESCRIPTION

Figure 1:
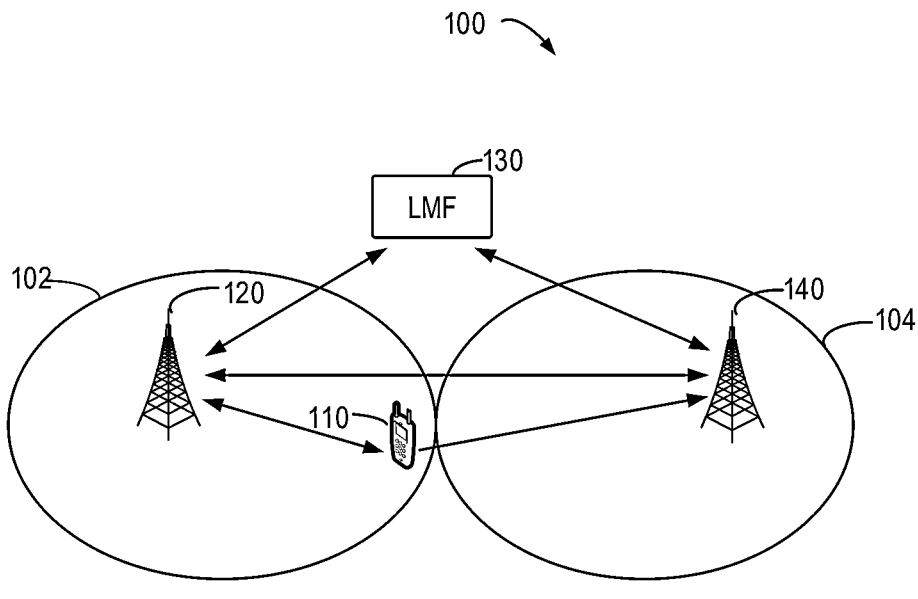
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Example Environment

FIG. 1 illustrates an example communication environment 100 in which example embodiments of the present disclosure can be implemented. The communication environment 100 may be a communication system supporting bandwidth part adaptation. As shown in FIG. 1, the communication environment 100 includes a first device 110, a second device 120, a third device 130, and a fourth device 140.

The first device 110 may be a terminal device (e.g., UE), including but not limited to a normal UE, a reduced capability (RedCap) UE, etc. Hereinafter, the first device 110 may be also referred to as terminal device 110 or UE 110. The first device 110, the second device 120, and the fourth device 140 may communicate with each other.

The second device 120 and the fourth device 140 are network devices, such as gNBs, transmit receive points (TRPs), etc., which provide cells 102 and 104 respectively for radio coverage. In the example shown in FIG. 1, the first device 110 is located in the cell 102 and served by the second device 120. The cell 104 is a neighbor cell with respect to the first device 110. Accordingly, the second device 120 and the fourth device 140 may be also referred to as a serving gNB 120 and a non-serving gNB 140, respectively. Moreover, the cells 102 and 104 may be also referred to as a serving cell 102 and a neighbor cell 104 respectively.

The third device 130 may be a location management device, such as, a network element for location management function (LMF), hereinafter which may be also referred to as LMF 130. The third device 130 may position the first device 110 based on positioning measurement reported from the second device 120 and the fourth device 140, which will be discussed in detail later.

In some example embodiments, a link from the first device 110 to the second device 120 or to the fourth device 140 is referred to as an uplink (UL). Additionally, a link from the second device 120 or from the fourth device 140 to the first device 110 is referred to as a downlink (DL).

In addition to SRS for Multiple Input Multiple Output (MIMO), the first device 110 may transmit SRS for a positioning purpose. For improved positioning performance and accuracy, the SRS transmissions may be performed in a frequency hopping manner, which is also called SRS frequency hopping. To this end, the second device 120 may configure multiple SRS resources or SRS resource sets with appropriate time gaps for radio switching. These SRS resources or SRS resource sets may locate within different bandwidth parts (BWPs). A single SRS frequency hop may be RBs occupied by an SRS resource configured within a specific BWP. For SRS frequency hopping for positioning, the multiple SRS resources located in multiple BWPs are transmitted through consecutive RBs (Resource Blocks), that is, multiple SRS frequency hops are transmitted without frequency separation. The gNB receives these multiple SRS frequency hops and performs coherent processing to extract a single positioning measurement. BWP is a subset of the entire bandwidth, and a size and parameters of a BWP can be flexibly configured. In some cases, a BWP is a configured bandwidth and subcarrier spacing.

The first device 110 then transmits narrow band SRSs across multiple SRS hops.

Accordingly, the second device 120 receives narrow band SRSs on the configured SRS resources or SRS resource sets.

The second device 120 may perform stitching on the SRS frequency hops, and measure the SRSs. Then, positioning measurements of the SRSs may be reported to the third device 130 for positioning the first device 110. Likewise, the fourth device 140 may receive the SRSs from the first device 110. The fourth device 140 may also perform stitching on the SRS frequency hops, and measure the SRSs. Then, positioning measurements of the SRSs may be reported to the third device 130.

The third device 130 may estimate a position of the first device 110 based on positioning measurements reported by the second device 120 and the fourth device 140. In some example embodiments, the positioning measurements may include an angle measurement such as Angle of Arrival (AoA), or a timing measurement such as Time of Arrival (ToA), Relative Time of Arrival (RToA), Carrier Phase (CP), etc., or any other measurement suitable for positioning.

It is to be understood that the number of devices and their connections shown in FIG. 1 are only for the purpose of illustration without suggesting any limitation. The communication network 100 may include any suitable number of devices configured to implementing example embodiments of the present disclosure. Although not shown, it would be appreciated that one or more additional devices and connections may be deployed in the communication network 100.

In the following, for the purpose of illustration, some example embodiments are described with the first device 110 operating as a terminal device (e.g., RedCap UE) and the second device 120 and fourth device 140 operating as network devices. However, in some example embodiments, operations described in connection with the terminal device may be implemented at a network device or other device, and operations described in connection with the network device may be implemented at a terminal device or other device.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In 5G NR, reduced capability (RedCap) UE has supported the positioning functionality. To support the UL SRS frequency hopping and stitching, RedCap UE may be configured with multiple SRS resources with appropriate time gap for radio frequency switching. The RedCap UE transmits narrow band SRSs across multiple SRS hops. Upon receiving all or some of them, the gNB performs stitching to the SRS frequency hops.

It should be noted that the SRS frequency hopping for positioning is different from the conventional SRS frequency hopping for MIMO in terms of SRS resource configuration. In particular, the conventional SRS frequency hopping is performed within an SRS resource configuration, while the SRS frequency hopping for positioning is performed based on multiple SRS resources within different BWPs.

Figure 2:
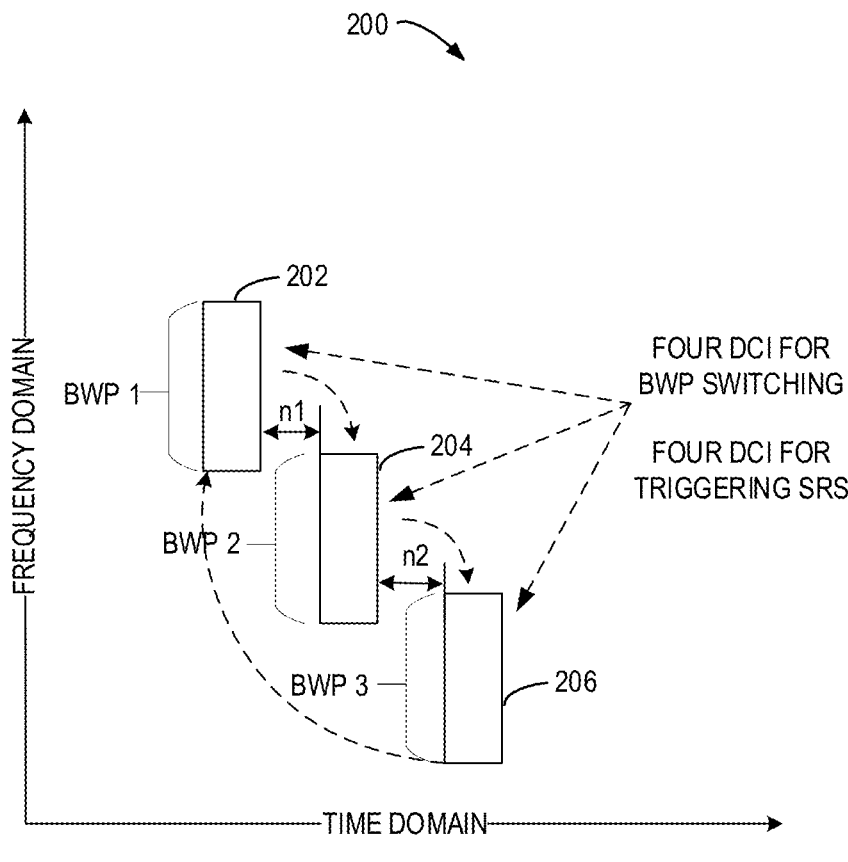
FIG. 2 illustrates a schematic diagram of an example UL SRS frequency hopping for positioning.

FIG. 2 illustrates a schematic diagram of an example UL SRS frequency hopping for positioning. SRS resources 202 to 206 respectively on different BWPs 1 to 3 are configured for SRS frequency hopping for positioning. As shown in FIG. 2, at least one SRS frequency hop consists of different SRS resources across different BWPs. To operate SRS frequency hopping across four SRS frequency hops by using aperiodic SRS, four downlink control information (DCI) indications are necessary for the BWP switching, including a DCI for returning to the original BWP 1. In addition, another four DCI indications are necessary for triggering four AP SRSs. This leads to an inefficient physical layer procedure to support SRS frequency hopping.

In order to solve the above issue as well as other potential issues, the present disclosure provides a solution of SRS frequency hopping. In the solution, consecutive SRSs for positioning are transmitted across multiple SRS resources or SRS resource sets within different BWPs via a single DCI. Furthermore, the aperiodic SRS can be triggered by flexible SRS resource configurations that may correspond to SRS resource level or SRS resource sets.

Work Principle and Example Signaling for Communication

According to some example embodiments of the present disclosure, there is provided a positioning solution. In this solution, a first device receives, from a second device providing a serving cell for the first device, a configuration of a plurality of SRS triggering states associated with a plurality of SRSs on a group of bandwidth parts. The first device receives, from the second device, an indication of a target triggering state of the plurality of SRS triggering states. The first device then transmits, based on the target triggering state, the plurality of SRSs on at least a part of the group of bandwidth parts sequentially.

In this way, SRS frequency hopping operations for positioning are triggered via single DCI. Moreover, the serving gNB also provides BWP information used for SRS frequency hopping to LMF and other non-serving gNBs. As a result, LMF is able to request the serving gNB to trigger a specific SRS triggering state. The other gNBs can receive SRS transmissions on non-serving cells, and report positioning measurements to LMF.

Example embodiments of the present disclosure will be described in detail below with reference to the accompanying drawings.

Figure 3:
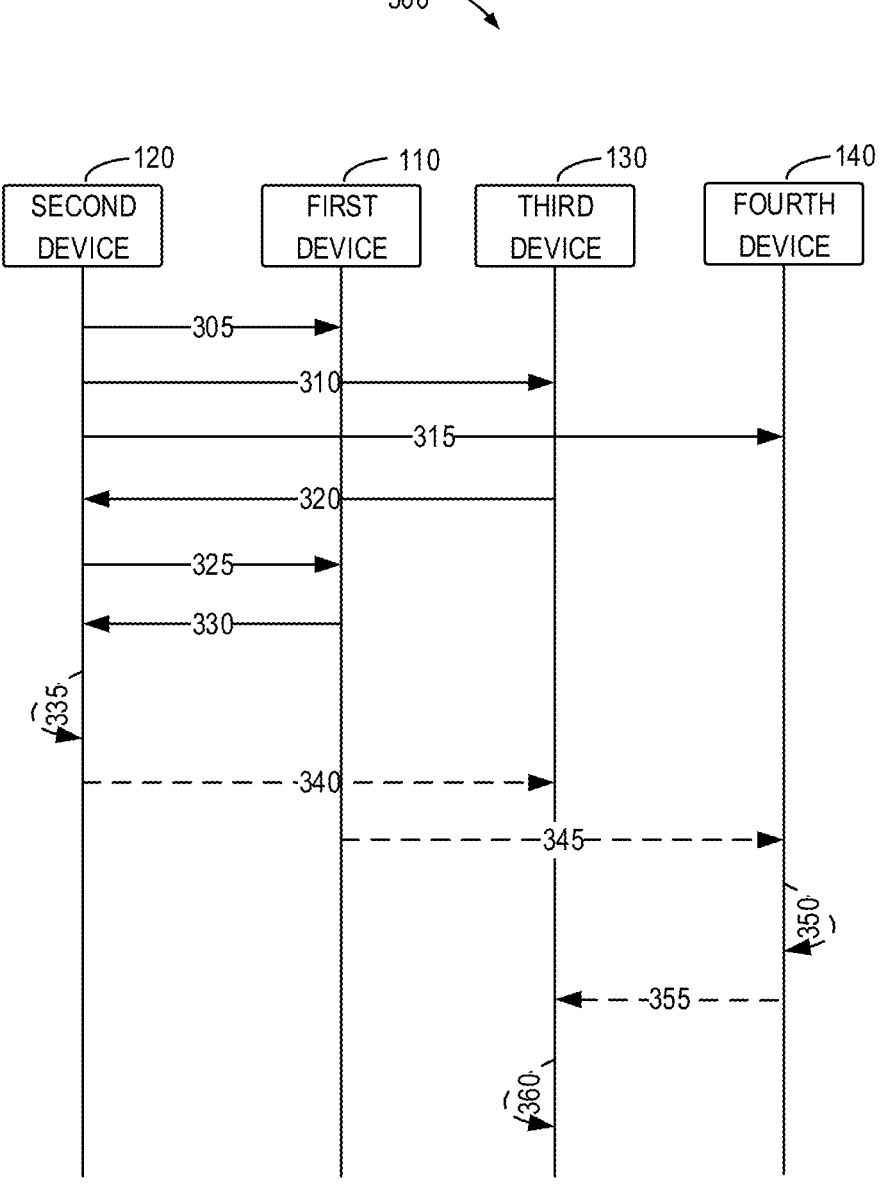
FIG. 3 illustrates a signaling chart for SRS frequency hopping according to some example embodiments of the present disclosure.

Reference is now made to FIG. 3, which illustrates a signaling chart for SRS frequency hopping according to some example embodiments of the present disclosure. As shown in FIG. 3, the process 300 involves the first device 110, the second device 120, the third device 130 and the fourth device 140. For the purpose of discussion, reference is made to FIG. 1 to describe the signaling flow 300.

Before the process 300, the first device 110 may report a capability of performing SRS frequency hopping and stitching operation to its serving gNB, i.e., the second device 120. For example, the first device 110 may report the device capability to indicate whether it is normal UE or RedCap UE. In some example embodiments, the second device 120 may determine whether to enable the SRS frequency hopping and stitching via single DCI based on the device capability. However, it should be understood that the proposed SRS frequency hopping and stitching can be implemented by UEs with various capabilities. Thus, the reporting of the device capability may not be necessary for implementation of the process 300.

Figure 4:
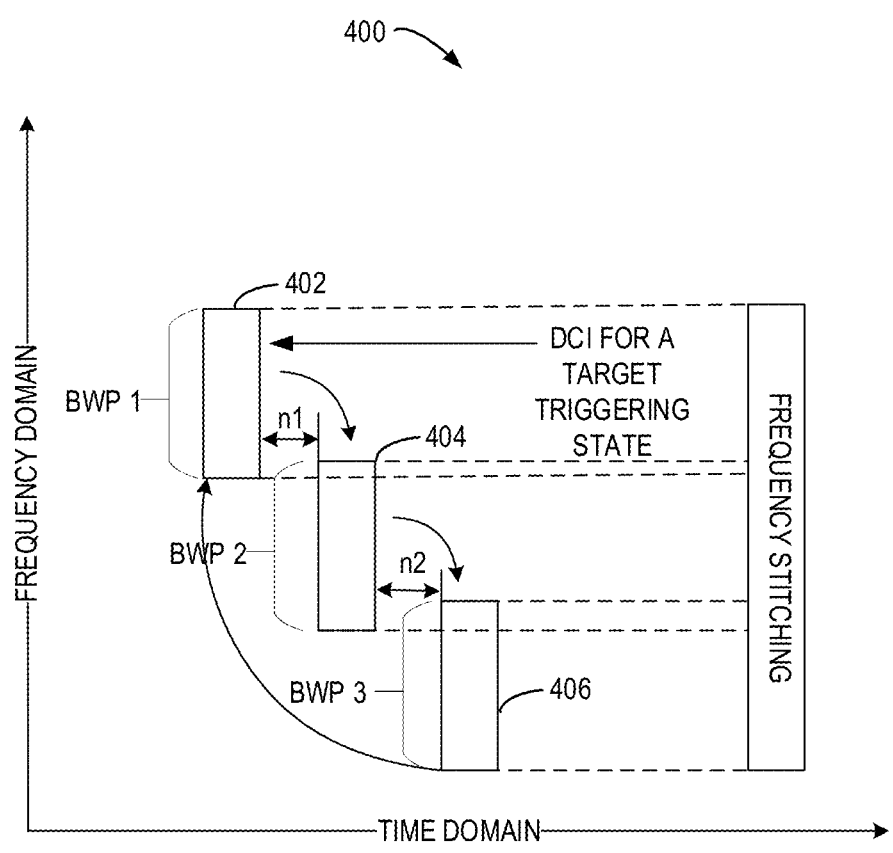
FIG. 4 illustrates a schematic diagram of an example SRS frequency hopping and stitching according to some example embodiments of the present disclosure.

The first device 110 is configured with a plurality of SRS resources which are UL BWP-specific. That is, at least one of the plurality of SRS resources is configured within a specific UL BWP. FIG. 4 illustrates a schematic diagram of an example SRS frequency hopping and stitching 400 according to some example embodiments of the present disclosure. As shown in FIG. 4, SRS resources 402 to 406 are configured for SRS frequency hopping and stitching, where SRS resource 402 is specific to BWP 1, SRS resource 404 is specific to BWP 2 and SRS resource 406 is specific to BWP 3. It should be understood that in the context of the present disclosure, BWPs configured for SRS transmission refers to UL BWPs, thus hereinafter UL BWPs may be simply called BWPs.

In the process 300, the second device 120 transmits 305 a configuration of a plurality of SRS triggering states to the first device 110. In some example embodiments, SRS triggering states may include aperiodic SRS triggering states. The plurality of SRS triggering states are associated with a plurality of SRSs on a group of BWP 1 to BWP 3. The configuration of SRS triggering states may be contained, for example, in a radio resource control (RRC) message.

The SRS frequency hopping may be triggered on an SRS resource set level, an SRS resource level, or their combination. By way of example, for the SRS resource configuration shown in FIG. 4, there may be three SRS resource sets within the group of BWP 1 to BWP 3, i.e., a first SRS resource set, a second SRS resource set and a third SRS resource set.

The serving gNB also provides information used for SRS frequency hopping to the LMF and non-serving gNB. To this end, the second device 120 transmits 310 a configuration of SRS frequency hopping corresponding to the plurality of SRS triggering states to the third device 130. Additionally, or alternatively, the second device 120 may transmit 315 the configuration of SRS frequency hopping to the fourth device 140. For example, the configuration of SRS frequency hopping may include at least one of: the plurality of aperiodic SRS triggering states, a set of indication values corresponding to the plurality of aperiodic SRS triggering states, and so on. In some example embodiments, the indication values corresponding to the aperiodic SRS triggering states may be DCI code points.

The third device 130 transmits 320 a request for triggering a target triggering state of the plurality of SRS triggering states to the second device 120. Thus, the LMF may request the serving gNB to trigger a specific triggering state.

In response to the request, the second device 120 then transmits 325 an indication of the target triggering state to the first device 110. The indication may be contained, for example, in DCI. In this way, the serving gNB may trigger a specific SRS triggering state.

As one of the implementations, at least one aperiodic SRS triggering state may comprise a sequence of pairs of an SRS and a corresponding BWP that is one of the group of BWP 1 to BWP 3. An example format of an SRS triggering state may be a sequence of (UL BWP #ID, SRS resource set #ID), or a sequence of (UL BWP #ID, SRS resource set #ID, SRS resource #ID) depending on triggering level.

From the perspective of UE, there is one active BWP for a UE, so a specific triggering state indicates that multiple BWPs are sequentially activated and released, rather than activated simultaneously. Accordingly, the UE performs BWP switching and transmits SRS in at least one BWP.

By way of example, the plurality of SRS triggering states may be as follows:

SRS Triggering State #1: (UL BWP #1, SRS resource set #1 of UL BWP #1), (UL BWP #2, SRS resource set #2 of UL BWP #2), (UL BWP #3, SRS resource set #3 of UL BWP #3)

SRS Triggering State #2: (UL BWP #1, SRS resource set #1, SRS resource #1 of UL BWP #1), (UL BWP #2, SRS resource set #2, SRS resource #2 of UL BWP #2), (UL BWP #3, SRS resource set #3 of UL BWP #3)

It should be understood that even if an index of the SRS resource set is the substantially same across multiple BWPs, it may not necessarily refer to the substantially same SRS resource set.

In this example, if SRS triggering State #1 is triggered, the first device 110 performs aperiodic SRS frequency hopping based on the sequence as indicated by SRS triggering State #1. In particular, the first device 110 may understand that the starting BWP for SRS frequency hopping is UL BWP #1, e.g., BWP 1 as shown in FIG. 4. Thus, the first device 110 first activates BWP 1, and transmits SRS on the first SRS resource set indexed by SRS resource set #1 and located within BWP 1. The first device 110 then performs BWP switching from BWP 1 to BWP 2 (e.g., indexed by UL BWP #2) during time gap n1. As a result, BWP 1 is released, and BWP 2 is activated. Upon activating BWP 2, the first device 110 transmits SRS on the second SRS resource set indexed by SRS resource set #2 and located within BWP 2. The first example, a higher layer parameter "srs-Request-for-hop-ping" is used for indicating the aperiodic SRS frequency hopping. If "srs-Request-for-hopping" is set to a first value, i.e., "enabled", the first device 110 may be aware that DCI comprises the indication of the target triggering state, which will be discussed later.

Additionally, as shown in table 1, the RRC may include a plurality of higher layer parameters, where:

"Max_Number_number_of_triggering_state" indicates the maximum number of aperiodic SRS triggering states, "Max_Number_of_state_element" indicates the maximum elements comprising an aperiodic SRS triggering state, "TriggerState_index" indicates an index of the aperiodic SRS triggering state, Slot/symbol-offset(s) between BWPs indicates the time gap for BWP switching, transmit beam information, such as, TRP ID and/or PRS resource information, physical cell ID and/or SS/PBCH block information are spatial relation information, which is configured per at least one SRS resource level; in some embodiments, the serving gNB may configure the substantially same spatial relation information for all or some SRS resources used for as periodic SRS frequency hopping as they may be targeted to the substantially same TRP.

TABLE 1

| a configuration of aperiodic SRS triggering states via RRC configuration signaling |
|---|
| TriggerState ::= SEQUENCE{<br>TriggerState_index   INTEGER(1..Max_Number_number_of_triggering_state)<br>TriggerState_element_list   SEQUENCE(SIZE(1.. max_number_of_TriggeringState_element)) OF<br>TriggerState_element_index<br>}<br>TriggerState_element ::= SEQUENCE {<br>TriggerState_element_index  INTEGER(1..Max_Number_of_state_element)<br>UL_bwpIDs_   INTEGER (1.. Max_Number_of_UP_BWP_IDs)<br>SRS_Resource_Set_IDs  INTEGER (1.. Max_Number_of_UP_BWP_IDs)<br>BWP-switching-offset-for-the- UL_bwpIDs ::= {n1, n2, ..., }<br>Additional_spatial relation information {<br>TRP ID,<br>PRS resource ID,<br>Physical Cell ID,<br>SS/PBCH block index<br>}<br>}<br>srs-Request-for-hopping   NUMERATED {enabled} | device then performs BWP switching from BWP 2 to BWP 3 (e.g., indexed by UL BWP #3) during time gap n2. As a result, BWP 2 is released, and BWP 3 is activated. Upon activating BWP 3, the first device 110 transmits SRS on the third SRS resource set indexed by SRS resource set #3 and located within BWP 3. After transmitting SRS, the first device 110 performs BWP switching for returning back to the starting BWP 1. In another example, the first device 110 may not perform BWP switching and stay in the BWP 3.

If SRS triggering State #2 is triggered, the first device 110 performs aperiodic SRS frequency hopping based on the sequence as indicated by SRS triggering State #2. Unlike SRS triggering State #1, SRS triggering State #2 supports SRS frequency hopping on SRS resource level. Accordingly, the first device 110 may sequentially activate BWP 1 to BWP 3, and transmit SRS on a corresponding SRS resource of at least one BWP.

An example configuration of aperiodic SRS triggering states via RRC signaling is shown in Table 1 below. In this As previously mentioned, the second device 120 may trigger a specific SRS triggering state by DCI signaling. For example, code points of DCI may indicate indexes of SRS triggering states corresponding to "TriggerState_index" in RRC. In this way, single DCI can be used to trigger multiple SRS resources or SRS resource sets within different BWPs. The second device 120 may also provide DCI code points for aperiodic SRS triggering states to the third device 130 at step 310 or as an additional step.

By way of example, an SRS request field in DCI may be used for indicating the target triggering state. Depending on configuration, the SRS request filed may include 1 or 2 bits. In a case where the higher layer parameter "srs-Request-for-hopping" is set to "enabled", the first device 110 interprets that the "SRS request field" in DCI indicates the triggering of a target triggering state, i.e., multiple SRS resource sets across multiple BWPs. For example, code point of the SRS request field "01" and "10" may be used to trigger "SRS Triggering State #1" and "SRS Triggering State #2" respectively.

With the above implementation, the gNB is able to flexibly trigger the aperiodic SRS frequency hopping by configuring various triggering states which relate to different SRS resources or SRS resource sets, and indicating any of them via single DCI. In some cases, this may need a change to the existing DCI signaling.

As another implementation, the configuration of the plurality of aperiodic SRS triggering states may comprise the group of BWP 1 to BWP 3. An example configuration of aperiodic SRS triggering states via RRC signaling is shown in Table 2 below.

indicate that SRS transmission is to be performed based on "aperiodic SRS frequency hopping" or "legacy aperiodic SRS".

For this operation, the second device 120 configures the higher-layer parameter "SRS-PosResourceSet-r16" by setting "Resource Type" to "aperiodic" for the SRS resource sets. In addition, the second device 120 configures the substantially same value (e.g., an integer number) of "aperiodicSRS-ResourceTriggerList", in order to trigger the aperiodic SRS resource sets configured as the substantially same value of "aperiodicSRS-ResourceTriggerList" via single DCI. For example, SRS resource set #1 and SRS resource set #2 are respectively configured within UL BWP #1 and UL BWP #2, and both SRS resource sets are

TABLE 2

| a configuration of aperiodic SRS triggering states via RRC configuration signaling |
|---|
| AP-SRS-triggered-UL-BWP-group ::= sequence { |
| UL-BWP-list ::= sequence (SIZE (1...N) of INTEGER(1... #Maximum__Number__of__the__UL__BWP__IDs) |
| enable__SRS__hopping__across__BWP                 ENUMERATED {enable} |
| BWP-switch-offset-for-the-BWP-list ::= {n1, n2, ....,} |

In this example, as shown in table 2, the RRC may include a plurality of higher layer parameters, where:

"UL-BWP-list" indicates a list of UL BWPs used for SRS transmission with aperiodic SRS frequency hopping, and these BWPs are to be triggered by DCI later, "enable_SRS_hopping_across_BWP" indicates whether aperiodic SRS frequency hopping is enabled, if the field is set to a fourth value "enabled", the aperiodic SRS frequency hopping is enabled, "BWP-switching-offset-for-the-BWP" indicates a slot offset or time gap for switching between BWPs included in the list as indicated by "UL-BWP-list".

Higher layer parameters "resourceType" and aperiodicSRS-ResourceTriggerList" are used to configure the aperiodic SRS resource sets. For example, the serving gNB may set the "resourceType" to "aperiodic" and "aperiodicSRS-ResourceTriggerList" to an integer or a sequence of integer numbers.

In some example embodiments, aperiodic SRS resource sets configured in the UL BWPs that are included in the field "UL-BWP-list" may be triggered by the substantially same single DCI, if the substantially same triggering state "aperiodicSRS-ResourceTriggerList" is indicated by the DCI. For example, with the configuration of SRS triggering states, the first device 110 is configured with a list of the UL BWPs {UL BWP #1, UL BWP #2, UL BWP #3}. If the higher layer parameter "enable_SRS_hopping_across_BWP" is set to "enabled", which means that a legacy DCI triggering a specific "triggering state" of aperiodic SRS resources via "aperiodicSRS-ResourceTriggerList" is applied to the configured aperiodic SRS resource sets in the BWPS indicated in "UL-BWP-list". Otherwise, if "enable_SRS_hopping_across_BWP" is set to "disabled", or "not enabled", or alternatively if "enable_SRS_hopping_across_BWP" is not configured, then the first device 110 may follow legacy aperiodic SRS transmission procedure triggered by multiple separate DCIs. Hence, with this implementation, DCI signaling of an existing format can be reused for trigging SRS transmission for positioning in a frequency hopping manner.

Additionally, or alternatively, in some other embodiments, the second device 120 may indicate whether to enable aperiodic SRS frequency hopping via DCI signaling. In this case, an additional bit in DCI may be needed to configured as "aperiodic". In addition, "aperiodicSRS-ResourceTriggerList" is set to a second value, for example, integer number "3" for both SRS resource set #1 and SRS resource set #2. If DCI indicated from the second device 120 comprises an SRS request field set to a third value corresponding to the second value, for example, the third value may be the DCI code point "11", the first device 110 may understand that a plurality of SRSs is to be transmit on SRS resource set #1 located in BWP 1 and on SRS resource set #2 located in BWP 2. There may be a time gap for BWP switching between BWP 1 and BWP 2.

After receiving the indication of the target triggering state, the first device 110 transmits 330 the plurality of SRSs on at least a part of the group of bandwidth parts sequentially based on the target triggering state.

Accordingly, the second device 120 may measure 335 the plurality of SRSs based on the target triggering state. The second device 120 may then transmit 340 a first report of positioning measurements of the plurality of SRSs. Additionally, the second device 120 may further transmit information on the target triggering state to the third device 130, and selectively the fourth device 140.

Alternatively, in some other embodiments, after receiving the information on the target triggering state from the second device 120, the third device 130 may further provide the information to the fourth device 140.

The fourth device 140 may also receive 345 the plurality of SRSs on at least a part of the group of bandwidth parts sequentially. As the fourth device 140 is provided with the information on aperiodic SRS frequency hopping, for example, aperiodic SRS triggering states, DCI code points, etc., the fourth device 140 is aware of the target triggering state. Accordingly, the fourth device 149 may measure 350 the plurality of SRSs based on the target triggering state. The fourth device 140 may then transmit 355 a second report of positioning measurements of the plurality of SRSs.

The positioning measurements may include but not limited to, an angle measurement such as AoA, a timing measurement such as ToA, RToA, CP, etc., or any other measurement suitable for positioning.

Accordingly, the third device 130 may determine 360 a position of the first device 110 based at least in part on the first report of positioning measurements of the plurality of SRSs. Additionally, or alternatively, in some example embodiments, the third device 130 may determine the position of the first device 110 based on positioning measurements reported by the second device 120, the positioning measurements reported by the fourth device 140 and information on the target triggering state.

It should be understood that some of the steps in process 300 are optional or can be omitted, and the order of the steps is given for an illustrative purpose. For example, step 310 may be performed in parallel to step 315. Step 330 may be performed in parallel to step 345, and so on. Thus, the embodiments of the present disclosure are not limited in this regard.

According to the example embodiments of the present disclosure, the SRS frequency hopping and stitching is enabled via a single DCI. The gNB is able to configure aperiodic SRS triggering options or triggering states via higher layer signaling, such as RRC. A specific triggering state may then be triggered via the DCI. In this way, the positioning accuracy and efficiency are improved, while the signaling overhead and latency are reduced. Such a solution provides an optimized SRS frequency hopping for positioning UEs, especially for RedCap UEs.

Example Methods

Figure 5:
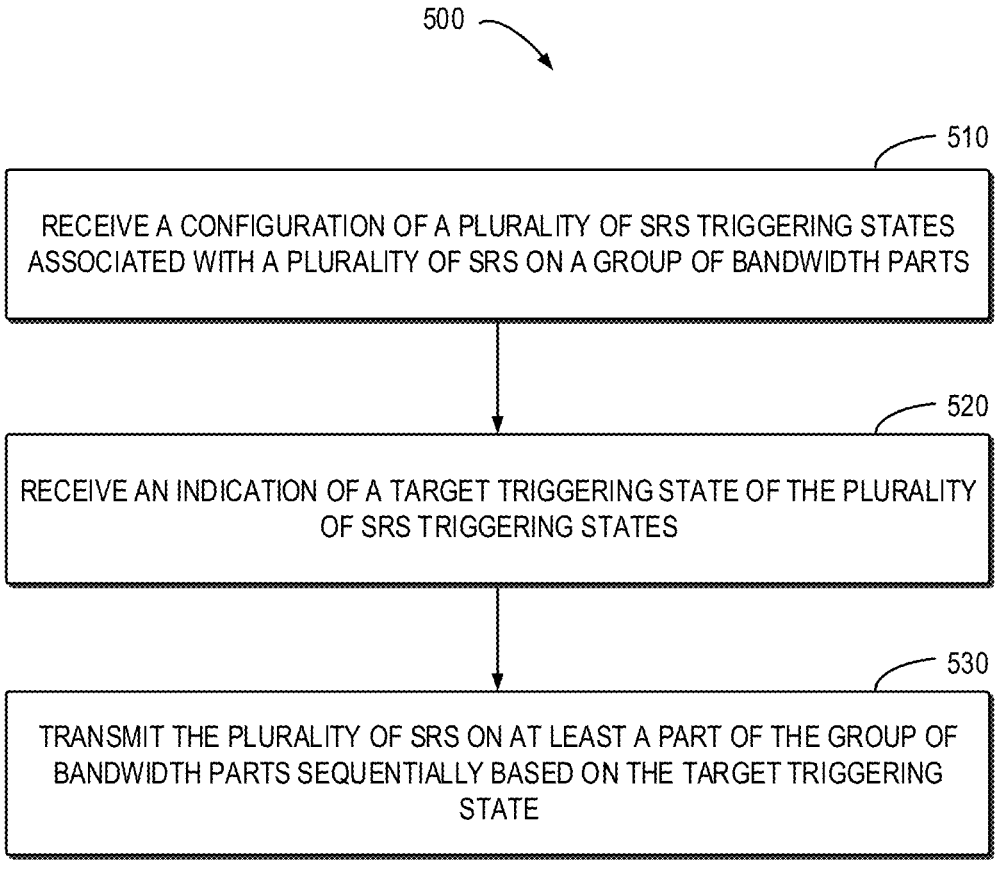
FIG. 5 illustrates a flowchart of a method implemented at a first device according to some example embodiments of the present disclosure.

FIG. 5 illustrates a flowchart of a method 500 implemented at a first device according to some example embodiments of the present disclosure. For example, the first device may include a terminal device. For the purpose of discussion, the method 500 will be described from the perspective of the first device 110 in FIG. 1.

At block 510, the first device 110 receives, from the second device 120 providing a serving cell 102 for the first device 110, a configuration of a plurality of SRS triggering states associated with a plurality of SRSs on a group of BWPs. For example, the configuration of the plurality of aperiodic SRS triggering states may be contained in a RRC message.

At block 520, the first device 110 receives, from the second device 120, an indication of a target triggering state of the plurality of SRS triggering states. For example, the indication of the target triggering state may be contained in DCI.

At block 530, the first device 110 transmits, based on the target triggering state, the plurality of SRSs on at least a part of the group of BWPs sequentially.

In some example embodiments, the plurality of SRS triggering states may comprise a plurality of aperiodic SRS triggering states. In this case, at least one of the plurality of aperiodic SRS triggering states may comprise a sequence of pairs of an SRS and a corresponding BWP that is one of the group of BWPs.

For example, the configuration of the plurality of SRS triggering states may be as follows:

SRS Triggering State #1: (UL BWP #1, SRS resource set #1 of UL BWP #1), (UL BWP #2, SRS resource set #2 of UL BWP #2), (UL BWP #3, SRS resource set #3 of UL BWP #3), SRS Triggering State #2: (UL BWP #1, SRS resource set #1, SRS resource #1 of UL BWP #1), (UL BWP #2, SRS resource set #2, SRS resource #2 of UL BWP #2), (UL BWP #3, SRS resource set #3 of UL BWP #3).

In some example embodiments, the target triggering state may comprise a sequence of pairs comprising at least a pair of a first SRS and a corresponding first BWP followed by a pair of a second SRS and a corresponding second BWP. In these embodiments, transmitting the plurality of SRSs may comprise: upon activating the first BWP based on the target triggering state, transmitting the first SRS on a first SRS resource or a first SRS resource set within the first BWP; and activating, based on the sequence indicated in the target triggering state, the second BWP by performing a switching from the first BWP to the second BWP while releasing the first BWP; and transmitting the second SRS on a second SRS resource or a second SRS resource set within the second BWP.

In some example embodiments, receiving the indication may comprise: in accordance with a determination that a field of SRS request for SRS frequency hopping in the RRC message (e.g., srs-Request-for-hopping) is set to a first value (e.g., "enabled"), obtaining the indication based on an indication value of an SRS request field in the DCI, the indication value corresponding to the target triggering state.

For example, the SRS request field in the DCI may include 1 or 2 bits depending on configuration. If the higher layer parameter "srs-Request-for-hopping" is set to "enabled", the first device 110 may interpret that the "SRS request field" indicated in DCI triggers the target triggering state, i.e., multiple SRS resource sets across multiple BWPs. For example, code point of the SRS request field "01" and "10" may be used to trigger "SRS Triggering State #1" and "SRS Triggering State #2" described above.

In some example embodiments, the configuration may further comprise at least one of the following: a maximum number of the plurality of aperiodic SRS triggering states, a maximum number of elements in at least one of the plurality of aperiodic SRS triggering state, an index of at least one of the plurality of aperiodic SRS triggering state, a field of SRS request for SRS frequency hopping.

In some example embodiments, the configuration may further comprise at least one of the following: time offsets for switching between at least two adjacent BWPs in at least one aperiodic SRS triggering state, spatial relation information comprising at least one of transmission reception point identity, positioning reference signal resource identity, physical cell identity, SS/PBCH block information.

In some example embodiments, the plurality of SRS triggering states may comprise a plurality of aperiodic SRS triggering states, and the configuration of the plurality of aperiodic SRS triggering states comprises the group of BWPs. In these embodiments, the method 500 may further comprise: receiving a configuration of an association between the plurality of aperiodic SRS triggering states and a plurality of SRS resource sets within the group of BWPs.

In some example embodiments, the configuration of the association may be contained in a RRC message, and indicated by a second value of an aperiodic SRS resource trigger list field (e.g., aperiodicSRS-ResourceTriggerList). In this case, receiving the indication may comprise: in accordance with a determination that a SRS request field in the DCI is set to a third value corresponding to the second value, determining the plurality of SRS resource sets associated with the second value to be activated or triggered sequentially on the group of BWPs.

For example, the first SRS resource set and the second SRS resource set are respectively configured within the first BWP and the second BWP, and higher layer parameter "resourceType" of both SRS resource sets are configured as "aperiodic". In addition, higher layer parameter "aperiodicSRS-ResourceTriggerList" is set to the second value "3" for both the first SRS resource set and the second SRS resource set. If "11" of the SRS request field in DCI (e.g., the third value) is indicated by the second device 120, the first device 110 is aware that a plurality of SRSs is to be transmitted on the first SRS resource set within the first BWP and the second SRS resource set within the second BWP with BWP switching.

In some example embodiments, the configuration of the plurality of aperiodic SRS triggering states may comprise at least one of the following: a field of enabling SRS frequency hopping across the group of BWPs, with a fourth value of the field indicating enabling of SRS frequency hopping on the group of BWPs, time offsets for switching between at least two adjacent BWPs in the group of BWPs.

In some example embodiments, the DCI may further comprise a field of enabling SRS frequency hopping across the group of BWPs (e.g., enable_SRS_hopping_across_BWP). A fourth value of the field of enabling SRS frequency hopping across the group of BWPs (e.g., "enabled") may indicate enabling of SRS frequency hopping on the group of BWPs.

In some example embodiments, the method 500 may further comprise: in accordance with a determination that the field of enabling SRS hopping across the group of BWPs is set to the fourth value, determining that the SRS frequency hopping is enabled on the group of BWPs.

In some example embodiments, the plurality of SRSs may be transmitted to at least one of the second device 120 or a fourth device 140 providing a neighbor cell 104.

In some example embodiments, the first device 110 may comprise a terminal device (e.g., UE), the second device 120 may comprise a network device (e.g., the serving gNB, TRP, etc.), the third device 130 may be the LMF, and the fourth device 140 may be another network device (e.g., non-serving gNB, TRP, etc.).

FIG. 6 illustrates a flowchart of an example method 600 implemented at a second device in accordance with some example embodiments of the present disclosure. For example, the second device may include a network device providing a serving cell for UE. For the purpose of discussion, the method 600 will be described from the perspective of the second device 120 in FIG. 1.

At 610, the second device 120 transmits, to the first device 110 in the serving cell 102 provided by the second device 120, a configuration of a plurality of SRS triggering states associated with a plurality of SRSs on a group of BWPs. For example, the configuration of the plurality of aperiodic SRS triggering states may be contained in a RRC message.

At 620, the second device 120 transmits, to the third device 130, a configuration of SRS frequency hopping corresponding to the plurality of SRS triggering states.

At 630, the second device 120 receives a request for triggering a target triggering state of the plurality of SRS triggering states from the third device 130.

In response to receiving the request from the third device 130, at 640, the second device 120 transmitting an indication of the target triggering state to the first device 110. For example, the indication of the target triggering state may be contained in DCI.

At 650, the second device 120 receives, from the first device 110 and based on the target triggering state, the plurality of SRSs on at least a part of the group of BWPs sequentially.

In some example embodiments, the plurality of SRS triggering states may comprise a plurality of aperiodic SRS triggering states. At least one of the plurality of aperiodic SRS triggering states may comprise a sequence of pairs of an SRS and a corresponding BWP that is one of the group of BWPs.

For example, the configuration of the plurality of SRS triggering states may be as follows:

SRS Triggering state #1: (UL BWP #1, SRS resource set #1 of UL BWP #1), (UL BWP #2, SRS resource set #2 of UL BWP #2), (UL BWP #3, SRS resource set #3 of UL BWP #3), SRS Triggering state #2: (UL BWP #1, SRS resource set #1, SRS resource #1 of UL BWP #1), (UL BWP #2, SRS resource set #2, SRS resource #2 of UL BWP #2), (UL BWP #3, SRS resource set #3 of UL BWP #3).

Additionally, or alternatively, in the above embodiments, the configuration of SRS frequency hopping may comprise the plurality of aperiodic SRS triggering states and a set of indication values corresponding to the plurality of aperiodic SRS triggering states.

In some example embodiments, the target triggering state may comprise a sequence of pairs comprising at least a pair of a first SRS and a corresponding first BWP followed by a pair of a second SRS and a corresponding second BWP. In this case, receiving the plurality of SRSs may comprise: receiving the first SRS on a first SRS resource or a first SRS resource set within the first BWP; and after receiving the first SRS, receiving the second SRS on a second SRS resource or a second SRS resource set within the second BWP.

In some example embodiments, the method 600 may further comprise: transmitting, to the first device 110, a RRC message comprising a field of SRS request for SRS frequency hopping (e.g., srs-Request-for-hopping) set to a first value (e.g., "enabled") indicative of SRS frequency hopping across the group of BWPs being enabled.

For example, the SRS request field in the DCI may include 1 or 2 bits depending on configuration. If the higher layer parameter "srs-Request-for-hopping" is set to "enabled", the first device 110 may interpret that the "SRS request field" indicated in DCI triggers the target triggering state, i.e., multiple SRS resource sets across multiple BWPs. For example, code point of the SRS request field "01" and "10" may be used to trigger "SRS Triggering State #1" and "SRS Triggering State #2" described above.

In some example embodiments, transmitting the indication may comprise: in accordance with a determination that the request comprises an indication value of the target triggering state, transmitting the indication comprising an SRS request field set to the indication value.

In some example embodiments, the configuration of the plurality of aperiodic SRS triggering states may further comprise at least one of the following: a maximum number of the plurality of aperiodic SRS triggering states, a maximum number of elements in at least one of the plurality of aperiodic SRS triggering state, an index of at least one of the plurality of aperiodic SRS triggering state, a field of SRS request for SRS frequency hopping.

In some example embodiments, the configuration of the plurality of aperiodic SRS triggering states further comprises at least one of the following: time offsets for switching between at least two adjacent BWPs in at least one aperiodic SRS triggering state, spatial relation information comprising at least one of transmission reception point identity, positioning reference signal resource identity, physical cell identity, SS/PBCH block information.

In some example embodiments, the plurality of SRS triggering states may comprise a plurality of aperiodic SRS triggering states, and the configuration of the plurality of aperiodic SRS triggering states may comprise the group of BWPs. In this case, the method 600 may further comprise: transmitting, to the first device 110, a configuration of an association between the plurality of aperiodic SRS triggering states and a plurality of SRS resource sets within a group of BWPs.

In some example embodiments, the configuration of the association may be contained in a RRC message, and indicated by a second value of an aperiodic SRS resource trigger list field (e.g., aperiodicSRS-ResourceTriggerList). The indication of the target triggering state may be contained in DCI. In these embodiments, the configuration of SRS frequency hopping may comprise a third value of the DCI indicating a triggering of the plurality of SRS resource sets within the group of BWPs.

For example, the first SRS resource set and the second SRS resource set are respectively configured within the first BWP and the second BWP, and higher layer parameter "resourceType" of both SRS resource sets are configured as "aperiodic". In addition, higher layer parameter "aperiodicSRS-ResourceTriggerList" is set to the second value "3" for both the first SRS resource set and the second SRS resource set. If "11" of the SRS request field in DCI (e.g., the third value) is indicated by the second device 120, the first device 110 is aware that a plurality of SRSs is to be transmitted on the first SRS resource set within the first BWP and the second SRS resource set within the second BWP with BWP switching.

In some example embodiments, transmitting the indication may comprise: in accordance with a determination that the request comprises the third value, determining that the target triggering state comprises the triggering of the plurality of SRS resource sets within the group of BWPs; and transmitting, to the first device 110, the DCI comprising an SRS request field set to the third value.

In some example embodiments, the configuration of the plurality of aperiodic SRS triggering states comprises at least one of the following: a field of enabling SRS frequency hopping across the group of BWPs, with a fourth value of the field indicating enabling of SRS frequency hopping on the group of BWPs, time offsets for switching between at least two adjacent BWPs in the group of BWPs.

In some example embodiments, the DCI may further comprise a field of enabling SRS frequency hopping across the group of BWPs (e.g., enable_SRS_hopping_across_BWP). A fourth value of the field of enabling SRS frequency hopping across the group of BWPs (e.g., "enabled") may indicate enabling of SRS frequency hopping on the group of BWPs.

In some example embodiments, the method 600 may further comprise: transmitting, to the third device 130, a first report of measurements of the plurality of SRSs and information on the target triggering state.

In some example embodiments, the method 600 may further comprise: transmitting, to a fourth device 140 providing a neighbor cell 104, the configuration of SRS frequency hopping.

In some example embodiments, the method 600 may further comprise: transmitting information on the target triggering state to the fourth device 140 for measuring the plurality of SRSs based on the target triggering state.

In some example embodiments, the first device 110 may comprise a terminal device (e.g., UE), the second device 120 may comprise a network device (e.g., the serving gNB, TRP, etc.), the third device 130 may be the LMF, and the fourth device 140 may be another network device (e.g., non-serving gNB, TRP, etc.).

Figure 7:
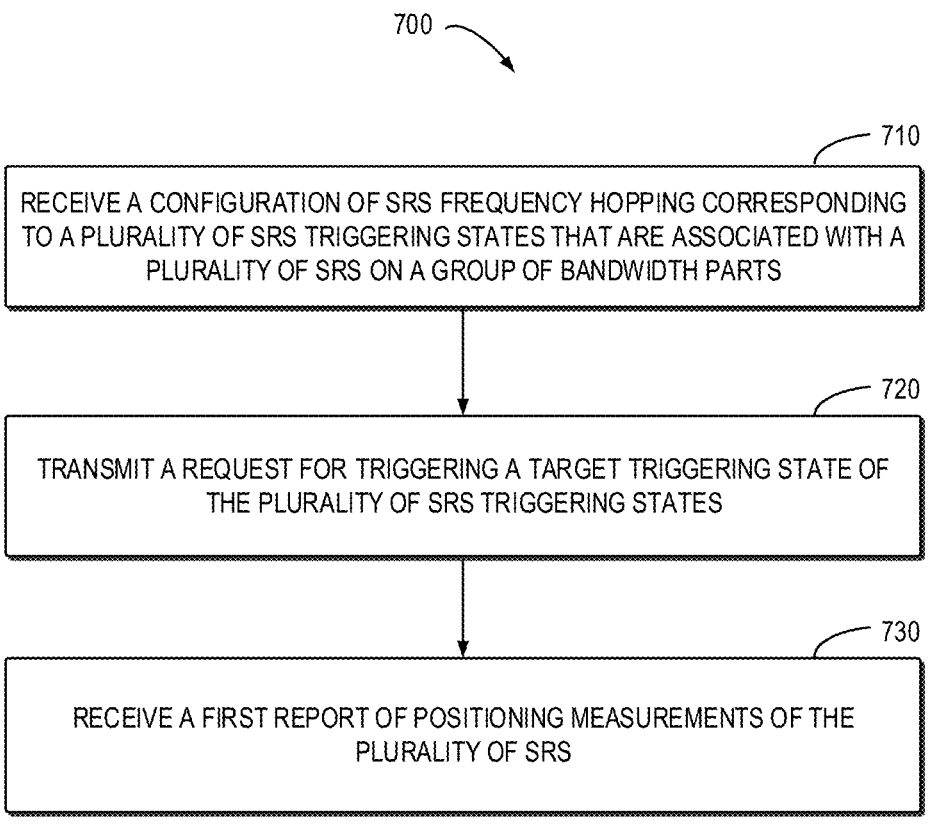
FIG. 7 illustrates a flowchart of a method implemented at a third device according to some example embodiments of the present disclosure.

FIG. 7 illustrates a flowchart of an example method 700 implemented at a third device in accordance with some example embodiments of the present disclosure. For example, the third device may include an LMF. For the purpose of discussion, the method 700 will be described from the perspective of the third device 130 in FIG. 1.

At block 710, the third device 130 receives, from the second device 120 providing the serving cell 102 for the first device 110, a configuration of SRS frequency hopping corresponding to a plurality of SRS triggering states that are associated with a plurality of SRSs on a group of BWPs.

At block 720, the third device 130 transmits, to the second device 120, a request for triggering a target triggering state of the plurality of SRS triggering states. The target triggering state may cause the first device 110 to transmit a plurality of SRSs on at least a part of the group of BWPs sequentially.

At block 730, the third device 130 receives, from the second device 120, a first report of positioning measurements of the plurality of SRSs.

In some example embodiments, the plurality of SRS triggering states may comprise a plurality of aperiodic SRS triggering states. The configuration of SRS frequency hopping may comprise the plurality of aperiodic SRS triggering states and a set of indication values corresponding to the plurality of aperiodic SRS triggering states.

In some example embodiments, transmitting the request may comprise: transmitting, to the second device 120, the request comprising an indication value of the target triggering state.

In some example embodiments, the configuration of SRS frequency hopping may comprise a third value of DCI indicating a triggering of a plurality of SRS resource sets within the group of BWPs.

In some example embodiments, transmitting the request may comprise: transmitting, to the second device 120, the request comprising the third value indicative of the target triggering state comprising the triggering of the plurality of SRS resource sets within the group of BWPs.

In some example embodiments, the method 700 may further comprise: receiving, from the second device 120, information on the target triggering state.

In some example embodiments, the method 700 may further comprise: transmitting the information on the target triggering state to a fourth device 140 for measuring the plurality of SRSs based on the target triggering state. The fourth device 140 provides a neighbor cell 104.

In some example embodiments, the method 700 may further comprise: receiving, from a fourth device 140 providing a neighbor cell 104, a second report of positioning measurements of the plurality of SRSs.

In some example embodiments, the method 700 may further comprise: determining a position of the first device 110 based at least in part on the first report of positioning measurements of the plurality of SRSs.

In some example embodiments, the first device 110 may comprise a terminal device (e.g., UE), the second device 120 may comprise a network device (e.g., the serving gNB, TRP, etc.), the third device 130 may be the LMF, and the fourth device 140 may be another network device (e.g., non-serving gNB, TRP, etc.).

FIG. 8 illustrates a flowchart of an example method 800 implemented at a fourth device in accordance with some example embodiments of the present disclosure. For example, the fourth device may include a network device providing a non-serving cell for UE. For the purpose of discussion, the method 800 will be described from the perspective of the fourth device 140 in FIG. 1

At block 810, the fourth device 140 receives, from the second device 120 providing the serving cell 102 for the first device 110, a configuration of SRS frequency hopping corresponding to a plurality of SRS triggering states that are associated with a plurality of SRSs on a group of BWPs.

In some example embodiments, the plurality of SRS triggering states may comprise a plurality of aperiodic SRS triggering states. The configuration of SRS frequency hopping may comprise the plurality of aperiodic SRS triggering states and a set of indication values corresponding to the plurality of aperiodic SRS triggering states.

In some example embodiments, the configuration of SRS frequency hopping may comprise a third value of DCI indicating a triggering of a plurality of SRS resource sets within the group of BWPs.

At block 820, the fourth device 140 receives information on a target triggering state of the plurality of SRS triggering states.

At block 830, the fourth device 140 receives, from the first device 110 and based on the target triggering state, the plurality of SRSs on at least a part of the group of BWPs sequentially.

In some example embodiments, the method 800 may further comprise: transmitting, to the third device 130, a second report of positioning measurements of the plurality of SRSs.

In some example embodiments, the first device 110 may comprise a terminal device (e.g., UE), the second device 120 may comprise a network device (e.g., the serving gNB, TRP, etc.), the third device 130 may be the LMF, and the fourth device 140 may be another network device (e.g., non-serving gNB, TRP, etc.).

Example Apparatus, Device and Medium

In some example embodiments, a first apparatus capable of performing any of the method 500 (for example, the first device 110 in FIG. 1) may comprise means for performing the respective operations of the method 500. The means may be implemented in any suitable form. For example, the means may be implemented in a circuitry or software module. The first apparatus may be implemented as or included in the first device 110 in FIG. 1.

In some example embodiments, the first apparatus comprises: means for receiving, from a second apparatus providing a serving cell for the first apparatus, a configuration of a plurality of sounding reference signal, SRS, triggering states associated with a plurality of SRSs on a group of bandwidth parts; means for receiving, from the second apparatus, an indication of a target triggering state of the plurality of SRS triggering states; and means for transmitting, based on the target triggering state, the plurality of SRSs on at least a part of the group of bandwidth parts sequentially.

In some example embodiments, the plurality of SRS triggering states comprises a plurality of aperiodic SRS triggering states, and at least one of the plurality of aperiodic SRS triggering states comprises a sequence of pairs of an SRS and a corresponding bandwidth part that is one of the group of bandwidth parts.

In some example embodiments, the target triggering state comprises a sequence of pairs comprising at least a pair of a first SRS and a corresponding first bandwidth part followed by a pair of a second SRS and a corresponding second bandwidth part. The means for transmitting the plurality of SRSs comprises: means for upon activating the first bandwidth part based on the target triggering state, transmitting the first SRS on a first SRS resource or a first SRS resource set within the first bandwidth part; means for activating, based on the sequence indicated in the target triggering state, the second bandwidth part by performing a switching from the first bandwidth part to the second bandwidth part while releasing the first bandwidth part; and means for transmitting the second SRS on a second SRS resource or a second SRS resource set within the second bandwidth part.

In some example embodiments, the configuration of the plurality of aperiodic SRS triggering states is contained in a radio resource control, RRC, message, and the indication of the target triggering state is contained in downlink control information, DCI.

In some example embodiments, the means for receiving the indication comprises: means for in accordance with a determination that a field of SRS request for SRS frequency hopping in the RRC message is set to a first value, obtaining the indication based on an indication value of an SRS request field in the DCI, the indication value corresponding to the target triggering state.

In some example embodiments, the configuration further comprises at least one of the following: a maximum number of the plurality of aperiodic SRS triggering states, a maximum number of elements in at least one of the plurality of aperiodic SRS triggering state, an index of at least one of the plurality of aperiodic SRS triggering state, a field of SRS request for SRS frequency hopping.

In some example embodiments, the configuration further comprises at least one of the following: time offsets for switching between at least two adjacent bandwidth parts in at least one aperiodic SRS triggering state, spatial relation information comprising at least one of transmission reception point identity, positioning reference signal resource identity, physical cell identity, synchronization signal and PBCH block information.

In some example embodiments, the plurality of SRS triggering states comprises a plurality of aperiodic SRS triggering states, and the configuration of the plurality of aperiodic SRS triggering states comprises the group of bandwidth parts. The first apparatus further comprises: means for receiving a configuration of an association between the plurality of aperiodic SRS triggering states and a plurality of SRS resource sets within the group of bandwidth parts.

In some example embodiments, the configuration of the association is contained in a RRC message, and indicated by a second value of an aperiodic SRS resource trigger list field, and the indication of the target triggering state is contained in DCI.

In some example embodiments, the means for receiving the indication comprises: means for in accordance with a determination that a SRS request field in the DCI is set to a third value corresponding to the second value, determining the plurality of SRS resource sets associated with the second value to be activated or triggered sequentially on the group of bandwidth parts.

In some example embodiments, the configuration of the plurality of aperiodic SRS triggering states comprises at least one of the following: a field of enabling SRS frequency hopping across the group of bandwidth parts, with a fourth value of the field indicating enabling of SRS frequency hopping on the group of bandwidth parts, time offsets for switching between at least two adjacent bandwidth parts in the group of bandwidth parts.

In some example embodiments, the DCI further comprises a field of enabling SRS frequency hopping across the group of bandwidth parts, and a fourth value of the field of enabling SRS frequency hopping across the group of bandwidth parts indicates enabling of SRS frequency hopping on the group of bandwidth parts.

In some example embodiments, the first apparatus further comprises: means for in accordance with a determination that the field of enabling SRS hopping across the group of bandwidth parts is set to the fourth value, determining that the SRS frequency hopping is enabled on the group of bandwidth parts.

In some example embodiments, the plurality of SRSs is transmitted to at least one of the second apparatus or a fourth apparatus providing a neighbor cell.

In some example embodiments, the first apparatus comprises a terminal device, and the second apparatus comprises a network device.

In some example embodiments, a second apparatus capable of performing any of the method 600 (for example, the second device 120 in FIG. 1) may comprise means for performing the respective operations of the method 600. The means may be implemented in any suitable form. For example, the means may be implemented in a circuitry or software module. The second apparatus may be implemented as or included in the second device 120 in FIG. 1.

In some example embodiments, the second apparatus comprises: means for transmitting, to a first apparatus in a serving cell provided by the second apparatus, a configuration of a plurality of SRS triggering states associated with a plurality of SRSs on a group of bandwidth parts; means for transmitting, to a third apparatus, a configuration of SRS frequency hopping corresponding to the plurality of SRS triggering states; means for in response to receiving a request for triggering a target triggering state of the plurality of SRS triggering states from the third apparatus, transmitting an indication of the target triggering state to the first apparatus; and means for receiving, from the first apparatus and based on the target triggering state, the plurality of SRSs on at least a part of the group of bandwidth parts sequentially.

In some example embodiments, the plurality of SRS triggering states comprises a plurality of aperiodic SRS triggering states, and at least one of the plurality of aperiodic SRS triggering states comprises a sequence of pairs of an SRS and a corresponding bandwidth part that is one of the group of bandwidth parts.

In some example embodiments, the configuration of SRS frequency hopping comprises the plurality of aperiodic SRS triggering states and a set of indication values corresponding to the plurality of aperiodic SRS triggering states.

In some example embodiments, the target triggering state comprises a sequence of pairs comprising at least a pair of a first SRS and a corresponding first bandwidth part followed by a pair of a second SRS and a corresponding second bandwidth part. The means for receiving the plurality of SRSs comprises: means for receiving the first SRS on a first SRS resource or a first SRS resource set within the first bandwidth part; and means for after receiving the first SRS, receiving the second SRS on a second SRS resource or a second SRS resource set within the second bandwidth part.

In some example embodiments, the configuration of the plurality of aperiodic SRS triggering states is contained in a RRC message, and the indication of the target triggering state is contained in DCI.

In some example embodiments, the second apparatus further comprises: means for transmitting, to the first apparatus, a RRC message comprising a field of SRS request set to a first value indicative of SRS frequency hopping across the group of bandwidth parts being enabled.

In some example embodiments, the means for transmitting the indication comprises: means for in accordance with a determination that the request comprises an indication value of the target triggering state, transmitting the indication comprising an SRS request field set to the indication value.

In some example embodiments, the configuration of the plurality of aperiodic SRS triggering states further comprises at least one of the following: a maximum number of the plurality of aperiodic SRS triggering states, a maximum number of elements in at least one of the plurality of aperiodic SRS triggering state, an index of at least one of the plurality of aperiodic SRS triggering state, a field of SRS request for SRS frequency hopping.

In some example embodiments, the configuration of the plurality of aperiodic SRS triggering states further comprises at least one of the following: time offsets for switching between at least two adjacent bandwidth parts in at least one aperiodic SRS triggering state, spatial relation information comprising at least one of transmission reception point identity, positioning reference signal resource identity, physical cell identity, synchronization signal and PBCH block information.

In some example embodiments, the plurality of SRS triggering states comprises a plurality of aperiodic SRS triggering states, and the configuration of the plurality of aperiodic SRS triggering states comprises the group of bandwidth parts. The second apparatus further comprises: means for transmitting, to the first apparatus, a configuration of an association between the plurality of aperiodic SRS triggering states and a plurality of SRS resource sets within a group of bandwidth parts.

In some example embodiments, the configuration of the association is contained in a RRC message, and indicated by a second value of an aperiodic SRS resource trigger list field, and the indication of the target triggering state is contained in DCI.

In some example embodiments, the configuration of SRS frequency hopping comprises a third value of the DCI indicating a triggering of the plurality of SRS resource sets within the group of bandwidth parts.

In some example embodiments, the means for transmitting the indication comprises: means for in accordance with a determination that the request comprises the third value, determining that the target triggering state comprises the triggering of the plurality of SRS resource sets within the group of bandwidth parts; and means for transmitting, to the first apparatus, the DCI comprising an SRS request field set to the third value.

In some example embodiments, the configuration of the plurality of aperiodic SRS triggering states comprises at least one of the following: a field of enabling SRS frequency hopping across the group of bandwidth parts, with a fourth value of the field indicating enabling of SRS frequency hopping on the group of bandwidth parts, time offsets for switching between at least two adjacent bandwidth parts in the group of bandwidth parts.

In some example embodiments, the DCI further comprises a field of enabling SRS frequency hopping across the group of bandwidth parts, and a fourth value of the field of enabling SRS frequency hopping across the group of bandwidth parts indicates enabling of SRS frequency hopping on the group of bandwidth parts.

In some example embodiments, the second apparatus further comprises: means for transmitting, to the third apparatus, a first report of measurements of the plurality of SRSs and information on the target triggering state.

In some example embodiments, the second apparatus further comprises: means for transmitting, to a fourth apparatus providing a neighbor cell, the configuration of SRS frequency hopping.

In some example embodiments, the second apparatus further comprises: means for transmitting information on the target triggering state to the fourth apparatus for measuring the plurality of SRSs based on the target triggering state.

In some example embodiments, the first apparatus comprises a terminal device, the second apparatus comprises a network device, and the third apparatus comprises a location management device.

In some example embodiments, a third apparatus capable of performing any of the method 700 (for example, the third device 130 in FIG. 1) may comprise means for performing the respective operations of the method 700. The means may be implemented in any suitable form. For example, the means may be implemented in a circuitry or software module. The second apparatus may be implemented as or included in the third device 130 in FIG. 1

In some example embodiments, the third apparatus comprises: means for receiving, from a second apparatus providing a serving cell for a first apparatus, a configuration of SRS frequency hopping corresponding to a plurality of SRS triggering states associated with a plurality of SRSs on a group of bandwidth parts; means for transmitting, to the second apparatus, a request for triggering a target triggering state of the plurality of SRS triggering states, the target triggering state causing the first apparatus to transmit a plurality of SRSs on at least a part of the group of bandwidth parts sequentially; and means for receiving, from the second apparatus, a first report of positioning measurements of the plurality of SRSs.

In some example embodiments, the plurality of SRS triggering states comprises a plurality of aperiodic SRS triggering states, and the configuration of SRS frequency hopping comprises the plurality of aperiodic SRS triggering states and a set of indication values corresponding to the plurality of aperiodic SRS triggering states.

In some example embodiments, the means for transmitting the request comprising: means for transmitting, to the second apparatus, the request comprising an indication value of the target triggering state.

In some example embodiments, the configuration of SRS frequency hopping comprises a third value of DCI indicating a triggering of a plurality of SRS resource sets within the group of bandwidth parts.

In some example embodiments, the means for transmitting the request comprises: means for transmitting, to the second apparatus, the request comprising the third value indicative of the target triggering state comprising the triggering of the plurality of SRS resource sets within the group of bandwidth parts.

In some example embodiments, the third apparatus further comprises: means for receiving, from the second apparatus, information on the target triggering state.

In some example embodiments, the third apparatus further comprises: means for transmitting the information on the target triggering state to a fourth apparatus for measuring the plurality of SRSs based on the target triggering state, the fourth apparatus providing a neighbor cell.

In some example embodiments, the third apparatus further comprises: means for receiving, from a fourth apparatus providing a neighbor cell, a second report of positioning measurements of the plurality of SRSs.

In some example embodiments, the third apparatus further comprises: means for determining a position of the first apparatus based at least in part on the first report of positioning measurements of the plurality of SRSs.

In some example embodiments, the first apparatus comprises a terminal device, the second apparatus comprises a network device, and the third apparatus comprises a location management device.

In some example embodiments, a fourth apparatus capable of performing any of the method 800 (for example, the fourth device 140 in FIG. 1) may comprise means for performing the respective operations of the method 800. The means may be implemented in any suitable form. For example, the means may be implemented in a circuitry or software module. The fourth apparatus may be implemented as or included in the fourth device 140 in FIG. 1.

In some example embodiments, the fourth apparatus comprises: means for receiving, from a second apparatus providing a serving cell for a first apparatus, a configuration of SRS frequency hopping corresponding to a plurality of SRS triggering states associated with a plurality of SRSs on a group of bandwidth parts; means for receiving information on a target triggering state of the plurality of SRS triggering states; and means for receiving, from the first apparatus and based on the target triggering state, the plurality of SRSs on at least a part of the group of bandwidth parts sequentially.

In some example embodiments, the plurality of SRS triggering states comprises a plurality of aperiodic SRS triggering states, and the configuration of SRS frequency hopping comprises the plurality of aperiodic SRS triggering states and a set of indication values corresponding to the plurality of aperiodic SRS triggering states.

In some example embodiments, the configuration of SRS frequency hopping comprises a third value of DCI indicating a triggering of a plurality of SRS resource sets within the group of bandwidth parts.

In some example embodiments, the fourth apparatus further comprises: means for transmitting, to a third apparatus, a second report of positioning measurements of the plurality of SRSs.

In some example embodiments, the first apparatus comprises a terminal device, the second apparatus comprises a first network device, and the fourth apparatus comprise a second network device.

Figure 9:
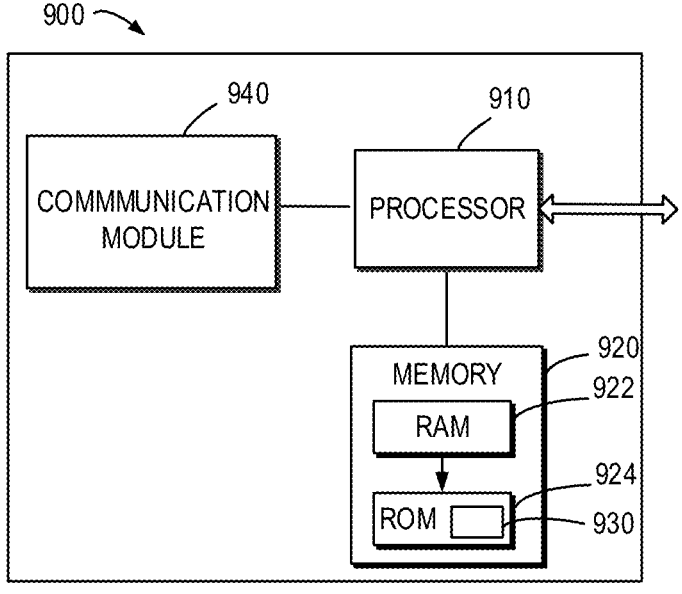
FIG. 9 illustrates a simplified block diagram of a device that is suitable for implementing example embodiments of the present disclosure.

FIG. 9 is a simplified block diagram of a device 900 that is suitable for implementing example embodiments of the present disclosure. The device 900 may be provided to implement an electronic device, for example, the first device 110, the second device 120, the third device 130, or the fourth device 140 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements.

In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The instructions of the program 930 may include instructions for performing operations/acts of some example embodiments of the present disclosure. The program 930 may be stored in the memory, e.g., the ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIG. 3 to FIG. 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 10:
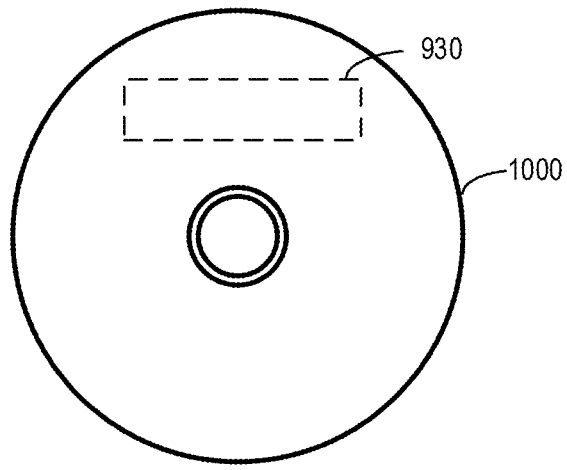
FIG. 10 illustrates a block diagram of an example computer readable medium in accordance with some example embodiments of the present disclosure.

FIG. 10 shows an example of the computer readable medium 1000 which may be in form of CD, DVD or other optical storage disk. The computer readable medium 1000 has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

PARTIAL GLOSSARY

| | |
|---|---|
| TRP | Transmit Receive Point |
| LMF | Location Management Function |
| IIoT | Industrial Internet of Things |
| UE | User Equipment |
| 5G | Fifth Generation |
| LTE | Long Term Evolution |
| LTE-A | LTE-Advanced |
| WCDMA | Wideband Code Division Multiple Access |
| HSPA | High-Speed Packet Access |
| NB-IoT | Narrow Band Internet of Things |
| NR | New Radio |
| BS | Base Station |
| AP | Access Point |
| eNodeB | Evolved NodeB |
| gNB/NR NB | Next Generation NodeB |
| RRU | Remote Radio Unit |
| RH | Radio Header |
| RH | Remote Radio Head |
| SS | Subscriber Station |
| MS | Mobile Station |
| AT | Access Terminal |
| VoIP | Voice over IP |
| PDA | Personal Digital Assistant |
| LEE | Laptop-embedded Equipment |
| LME | Laptop-mounted Equipment |
| USB | Universal Serial Bus |
| CPE | Customer-Premises Equipment |
| HMD | Head-mounted Display |
| MT | Mobile Termination |
| IAB | Integrated Access and Backhaul |
| DL | Downlink |
| UL | Uplink |
| Tx | Transmitting |
| Rx | Receiving |
| PRS | Positioning Reference Signal |
| SRS | Sounding Reference Signal |
| ID | Identity/Identifier |
| IEEE | Institute for Electrical and Electronics Engineers |
| CDMA | Code Division Multiple Access |
| FDMA | Frequency Division Multiple Access |
| TDMA | Time Division Multiple Access |
| FDD | Frequency Division Duplex |
| TDD | Time Division Duplex |
| MIMO | Multiple-Input Multiple-Output |
| OFDM | Orthogonal Frequency Division Multiple |
| DFT-s-OFDM | Discrete Fourier Transform spread OFDM |
| IoT | Internet of everything |
| eMTC | enhanced Machine-Type Communication |
| NR RedCap | NR reduced capacity |
| LPP | LTE Positioning Protocol |
| RSRP | Reference Signal Receive Power |
| RSRQ | Reference Signal Receive Quality |
| TD | Time Difference |
| RTT | Round-Trip Time |
| IE | Information Element |
| BWP | Bandwidth Part |
| DCI | Downlink Control Information |
| RRC | Radio Resource Control |
| PPW | PRS Processing Window |
| PDSCH | Physical Downlink Shared Channel |
| PDCCH | Physical Downlink Control Channel |

What is claimed is:

1. A second device, comprising:
a transmitter;
a receiver;
at least one processor; and at least one memory storing instructions that, when executed by the at least one processor, cause the second device at least to perform:

transmitting, using the transmitter, to a first device in a serving cell provided by the second device, a configuration of a plurality of positioning sounding reference signal (SRS) triggering states associated with a plurality of positioning SRSs on a group of bandwidth parts;

transmitting, using the transmitter, to a third device, a configuration of positioning SRS frequency hopping corresponding to the plurality of positioning SRS triggering states;

in response to receiving, using the receiver, a request for triggering a target triggering state of the plurality of positioning SRS triggering states from the third device, transmitting, using the transmitter, an indication of the target triggering state to the first device; and receiving, using the receiver, from the first device and based on the target triggering state, the plurality of positioning SRSs on a plurality of the group of bandwidth parts sequentially;

wherein the plurality of positioning SRS triggering states comprises a plurality of aperiodic positioning SRS triggering states, and at least one of the plurality of aperiodic positioning SRS triggering states comprises a sequence of pairs of a positioning SRS and a corresponding bandwidth part that is one of the group of bandwidth parts; and wherein the configuration of SRS frequency hopping comprises the plurality of aperiodic positioning SRS triggering states and a set of indication values corresponding to the plurality of aperiodic positioning SRS triggering states.

2. The second device of claim 1, wherein the target triggering state comprises a sequence of pairs comprising at least a pair of a first positioning sounding reference signal (SRS) and a corresponding first bandwidth part followed by a pair of a second positioning SRS and a corresponding second bandwidth part, and wherein receiving the plurality of positioning SRSs comprises:

receiving, using the receiver, the first SRS on a first positioning SRS resource or a first positioning SRS resource set within the first bandwidth part; and after receiving the first positioning SRS, receiving, using the receiver, the second positioning SRS on a second positioning SRS resource or a second positioning SRS resource set within the second bandwidth part.

3. The second device of claim 1, wherein the configuration of the plurality of aperiodic positioning SRS triggering states is contained in a radio resource control (RRC) message, and the indication of the target triggering state is contained in downlink control information (DCI).

* * * * *